(12) United States Patent
Wang

(10) Patent No.: US 11,320,705 B2
(45) Date of Patent: May 3, 2022

(54) LIQUID CRYSTAL DISPLAY PANEL AND LIQUID CRYSTAL DEFLECTION CONTROL METHOD

(71) Applicant: BOE Technology Group Co., Ltd., Beijing (CN)

(72) Inventor: Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 32 days.

(21) Appl. No.: 16/454,693

(22) Filed: Jun. 27, 2019

(65) Prior Publication Data

US 2020/0012159 A1    Jan. 9, 2020

(30) Foreign Application Priority Data

Jul. 3, 2018 (CN) .......................... 201810716327.7

(51) Int. Cl.
| | |
|---|---|
| *G02F 1/1343* | (2006.01) |
| *G02F 1/13* | (2006.01) |
| *G02F 1/133* | (2006.01) |
| *G02F 1/1335* | (2006.01) |

(52) U.S. Cl.
CPC ...... *G02F 1/134309* (2013.01); *G02F 1/1323* (2013.01); *G02F 1/13306* (2013.01); *G02F 1/133512* (2013.01); *G02F 1/133514* (2013.01); *G02F 1/134345* (2021.01)

(58) Field of Classification Search
None
See application file for complete search history.

(56) References Cited

U.S. PATENT DOCUMENTS

| | | | |
|---|---|---|---|
| 2014/0198277 A1* | 7/2014 | Yu | G02F 1/136286 349/43 |
| 2020/0257172 A1* | 8/2020 | Chen | G02F 1/133603 |

FOREIGN PATENT DOCUMENTS

| | | |
|---|---|---|
| CN | 101149494 A | 3/2008 |
| CN | 106652960 A | 5/2017 |
| CN | 106773218 A | 5/2017 |
| CN | 107450211 A | 12/2017 |

OTHER PUBLICATIONS

Office action dated Sep. 2, 2020 for application No. CN201810716327.7 with English translation attached.

* cited by examiner

*Primary Examiner* — Richard H Kim
(74) *Attorney, Agent, or Firm* — Nath, Goldberg & Meyer; Joshua B. Goldberg

(57) ABSTRACT

The present disclosure provides a liquid crystal display panel and a liquid crystal deflection control method. The liquid crystal display panel includes a color filter substrate and an array substrate which are assembled to form a cell, and liquid crystals located therebetween. The liquid crystal display panel further includes a plurality of pixel regions. Each pixel region includes a first area and a second area, the color filter substrate in each pixel region includes a black matrix covered by an orthographic projection of the second area on the color filter substrate, a light extracting member is disposed on a side of the array substrate in each pixel region adjacent to the liquid crystals and covered by an orthographic projection of the first area on the array substrate, and the light extracting member is configured to emit vertical light. Each pixel region further includes a liquid crystal deflection control device.

5 Claims, 4 Drawing Sheets

LIQUID CRYSTAL DISPLAY PANEL AND LIQUID CRYSTAL DEFLECTION CONTROL METHOD

CROSS-REFERENCE TO RELATED APPLICATION

The present application claims priority to Chinese patent application No. 201810716327.7 filed on Jul. 3, 2018, the disclosure of which is incorporated herein by reference in its entirety.

TECHNICAL FIELD

The present disclosure relates to the field of display technology, and in particular, to a liquid crystal display panel and a liquid crystal deflection control method.

BACKGROUND

With development of information and technology society, people's demands for display devices have increased significantly. Liquid crystal display device has obvious advantages in display quality and manufacturing cost, and thus has become one of mainstreams of the current display market.

The liquid crystal display panel is one of mainstream flat panel displays in the current market, and is used in various display fields such as instruments, mobile phones, monitors, and super large television sets. An anti-peep liquid crystal display can prevent others from peeping at content displayed by the display and thus plays an important role in many fields.

However, existing anti-peep liquid crystal displays generally have the following problems: first, display content is displayed only for a certain fixed viewing angle while being invisible from other viewing angles, and thus the anti-peep effect is only available at the fixed viewing angle; and second, the display effect is worse at an oblique viewing angle than at a frontal viewing angle, thus affecting a viewer's experience.

SUMMARY

The present disclosure provides a liquid crystal display panel including a color filter substrate and an array substrate which are assembled to form a cell, and liquid crystals located therebetween. The liquid crystal display panel includes a plurality of pixel regions, each of the plurality of pixel regions includes a portion of the color filter substrate, a portion of the array substrate, and liquid crystals located therebetween, and an orthographic projection of the portion of the color filter substrate in each pixel region on the array substrate overlaps the portion of the array substrate in the pixel region. An area of each pixel region where the liquid crystals of the pixel region are located includes a first area and a second area, the first area and the second area are arranged along a direction parallel to an plane in which the color filter substrate extends and an plane in which the array substrate extends, the portion of the color filter substrate in each pixel region includes a black matrix, the black matrix is disposed on a side of the color filter substrate adjacent to the liquid crystals and is covered by an orthographic projection of the second area of the pixel region on the color filter substrate, a light extracting member is disposed on a side of the portion of the array substrate in each pixel region adjacent to the liquid crystals and is covered by an orthographic projection of the first area of the pixel region on the array substrate, and the light extracting member is configured to emit vertical light having a traveling direction vertical to the plane in which the color filter substrate extends and the plane in which the array substrate extends. Each of the pixel regions further includes a liquid crystal deflection control device configured to control the liquid crystals in the first area and the second area of the pixel region to be deflected at different angles, respectively.

In some embodiments, the liquid crystal deflection control device includes a common electrode, a first electrode, and a second electrode. The common electrode is disposed on a side of the black matrix adjacent to the liquid crystals, and covers the first area and the second area. The first electrode is disposed on a side of the light extracting member adjacent to the liquid crystals, and includes a plurality of sub-electrodes arranged spaced apart from each other, and an orthographic projection of the first electrode on the array substrate overlaps the orthographic projection of the first area on the array substrate. The second electrode is disposed on a side of the array substrate adjacent to the liquid crystals, and an orthographic projection of the second electrode on the array substrate overlaps an orthographic projection of the second area on the array substrate. Deflection angles of the liquid crystals in the first area and the second area are changed by changing voltages applied to the first electrode and the second electrode.

In some embodiments, the common electrode includes a first portion covering the first area and a second portion covering the second area, and the first portion and the second portion are integrally formed.

In some embodiments, the common electrode includes a first portion covering the first area and a second portion covering the second area, and the first portion and the second portion are two sub-electrodes independent of each other.

In some embodiments, the second electrode is in a shape of strip.

The present disclosure further provides a liquid crystal deflection control method for controlling deflection of liquid crystals in a liquid crystal display panel. The liquid crystal display panel includes a color filter substrate and an array substrate which are assembled to form a cell, and liquid crystals located therebetween. The liquid crystal display panel includes a plurality of pixel regions, each of the plurality of pixel regions includes a portion of the color filter substrate, a portion of the array substrate, and liquid crystals located therebetween, and an orthographic projection of the portion of the color filter substrate in each pixel region on the array substrate overlaps the portion of the array substrate in the pixel region. An area of each pixel region where the liquid crystals of the pixel region are located includes a first area and a second area, the first area and the second area are arranged along a direction parallel to an plane in which the color filter substrate extends and an plane in which the array substrate extends, the portion of the color filter substrate in each pixel region includes a black matrix, the black matrix is disposed on a side of the color filter substrate adjacent to the liquid crystals and is covered by an orthographic projection of the second area of the pixel region on the color filter substrate, a light extracting member is disposed on a side of the portion of the array substrate in each pixel region adjacent to the liquid crystals and is covered by an orthographic projection of the first area of the pixel region on the array substrate, and the light extracting member is configured to emit vertical light having a traveling direction vertical to the plane in which the color filter substrate extends and the plane in which the array substrate extends. Each of the pixel regions further includes a liquid crystal deflection control device for controlling deflection of liquid crystals in the first area and the second area of the pixel region respectively. The liquid crystal deflection control method includes: controlling the liquid crystals in the first area and the second area to be deflected at different angles respectively by using the liquid crystal deflection control device, so as to selectively perform one of display at different gray scales for a vertical viewing angle and display at different gray scales for an oblique viewing angle.

In some embodiments, the liquid crystal deflection control device includes a common electrode, a first electrode, and a second electrode; the common electrode is disposed on a side of the black matrix adjacent to the liquid crystals, and covers the first area and the second area; the first electrode is disposed on a side of the light extracting member adjacent to the liquid crystals, and includes a plurality of sub-electrodes arranged spaced apart from each other, and an orthographic projection of the first electrode on the array substrate overlaps the orthographic projection of the first area on the array substrate; and the second electrode is disposed on a side of the array substrate adjacent to the liquid crystals, and an orthographic projection of the second electrode on the array substrate overlaps an orthographic projection of the second area on the array substrate. The controlling the liquid crystals in the first area and the second area to be deflected at different angles respectively by using the liquid crystal deflection control device, so as to perform the display at different gray scales for the vertical viewing angle includes: applying a first voltage to the second electrode and applying a voltage of 0V to the plurality of sub-electrodes such that the vertical light emitted from the light extracting member is incident on the color filter substrate vertically, and a gray scale of the liquid crystal display panel for the vertical viewing angle is 255.

In some embodiments, the liquid crystal deflection control device includes a common electrode, a first electrode, and a second electrode; the common electrode is disposed on a side of the black matrix adjacent to the liquid crystals, and covers the first area and the second area; the first electrode is disposed on a side of the light extracting member adjacent to the liquid crystals, and includes a plurality of sub-electrodes arranged spaced apart from each other, and an orthographic projection of the first electrode on the array substrate overlaps the orthographic projection of the first area on the array substrate; and the second electrode is disposed on a side of the array substrate adjacent to the liquid crystals, and an orthographic projection of the second electrode on the array substrate overlaps an orthographic projection of the second area on the array substrate. The controlling the liquid crystals in the first area and the second area to be deflected at different angles respectively by using the liquid crystal deflection control device, so as to perform the display at different gray scales for the vertical viewing angle includes: applying a first voltage to the second electrode, and applying different voltages to the plurality of sub-electrodes respectively in such a way that the closer each sub-electrode of the plurality of sub-electrodes is to the second area, the smaller the voltage applied to the sub-electrode is, such that the vertical light emitted from the light extracting member is refracted by the liquid crystals in the first area, and at least a portion of the refracted light is absorbed by the black matrix.

In some embodiments, the liquid crystal deflection control method further includes: adjusting the voltages applied to the plurality of sub-electrodes respectively, such that a gray scale of the liquid crystal display panel for the vertical viewing angle varies from 0 to 254.

In some embodiments, the first voltage is preset to be 8V; the first electrode includes a first sub-electrode, a second sub-electrode, and a third sub-electrode arranged in a direction gradually approaching the second area, and voltages of 8V, 4V, and 0V are applied respectively to the first sub-electrode, the second sub-electrode, and the third sub-electrode, such that the gray scale of the liquid crystal display panel for the vertical viewing angle is 0.

In some embodiments, the first voltage is preset to be 8V; the first electrode includes a first sub-electrode, a second sub-electrode, and a third sub-electrode arranged in a direction gradually approaching the second area, and voltages of 5V, 2V, and 0V are applied respectively to the first sub-electrode, the second sub-electrode, and the third sub-electrode, such that the gray scale of the liquid crystal display panel for the vertical viewing angle is 127.

In some embodiments, the liquid crystal deflection control device includes a common electrode, a first electrode, and a second electrode; the common electrode is disposed on a side of the black matrix adjacent to the liquid crystals, and covers the first area and the second area; the first electrode is disposed on a side of the light extracting member adjacent to the liquid crystals, and includes a plurality of sub-electrodes arranged spaced apart from each other, and an orthographic projection of the first electrode on the array substrate overlaps the orthographic projection of the first area on the array substrate; and the second electrode is disposed on a side of the array substrate adjacent to the liquid crystals, and an orthographic projection of the second electrode on the array substrate overlaps an orthographic projection of the second area on the array substrate. The controlling the liquid crystals in the first area and the second area to be deflected at different angles respectively by using the liquid crystal deflection control device, so as to perform the display at different gray scales for the oblique viewing angle includes: applying a voltage of 0V to the second electrode, and applying different voltages to the plurality of sub-electrodes respectively in such a way that the closer each sub-electrode of the plurality of sub-electrodes is to the second area, the smaller the voltage applied to the sub-electrode is, such that the vertical light emitted from the light extracting member is refracted by the liquid crystals in the first area, the refracted light passes through the second area and then is emitted onto the color filter substrate obliquely, and a gray scale of the liquid crystal display panel for the oblique viewing angle is 255.

In some embodiments, the first electrode includes a first sub-electrode, a second sub-electrode, and a third sub-electrode arranged in a direction gradually approaching the second area, and voltages of 8V, 4V, and 0V are applied respectively to the first sub-electrode, the second sub-electrode, and the third sub-electrode.

In some embodiments, the liquid crystal deflection control device includes a common electrode, a first electrode, and a second electrode; the common electrode is disposed on a side of the black matrix adjacent to the liquid crystals, and covers the first area and the second area; the first electrode is disposed on a side of the light extracting member adjacent to the liquid crystals, and includes a plurality of sub-electrodes arranged spaced apart from each other, and an orthographic projection of the first electrode on the array substrate overlaps the orthographic projection of the first area on the array substrate; and the second electrode is disposed on a side of the array substrate adjacent to the liquid crystals, and an orthographic projection of the second electrode on the array substrate overlaps an orthographic projection of the second area on the array substrate. The controlling the liquid crystals in the first area and the second area to be deflected at different angles respectively by using the liquid crystal deflection control device, so as to perform the display at different gray scales for the oblique viewing angle includes: applying a second voltage to the second electrode, and applying different voltages to the plurality of sub-electrodes respectively, wherein the closer each sub-electrode of the plurality of sub-electrodes is to the second area, the smaller the voltage applied to the sub-electrode is, such that the vertical light emitted from the light extracting member is refracted by the liquid crystals in both the first area and the second area, and at least a portion of the refracted light is absorbed by the black matrix.

In some embodiments, the liquid crystal deflection control method further includes: adjusting the second voltage applied to the second electrode such that a gray scale of the liquid crystal display panel for the oblique viewing angle varies from 0 to 254.

In some embodiments, the first electrode includes a first sub-electrode, a second sub-electrode, and a third sub-electrode arranged in a direction gradually approaching the second area, and voltages of 8V, 4V, and 0V are applied respectively to the first sub-electrode, the second sub-electrode, and the third sub-electrode; and the second voltage applied to the second electrode is 5V such that the gray scale of the liquid crystal display panel for the oblique viewing angle is 127.

In some embodiments, the first electrode includes a first sub-electrode, a second sub-electrode, and a third sub-electrode arranged in a direction gradually approaching the second area, and voltages of 8V, 4V, and 0V are applied respectively to the first sub-electrode, the second sub-electrode, and the third sub-electrode; and the second voltage applied to the second electrode is 8V such that the gray scale of the liquid crystal display panel for the oblique viewing angle is 0.

In some embodiments, a voltage of 0V is applied to the common electrode.

DETAILED DESCRIPTION

In order to enable those skilled in the art to better understand technical solutions of the present disclosure, a liquid crystal display panel and a liquid crystal deflection control method provided in the present disclosure will be described below in detail in conjunction with the accompanying drawings.

Figure 1:
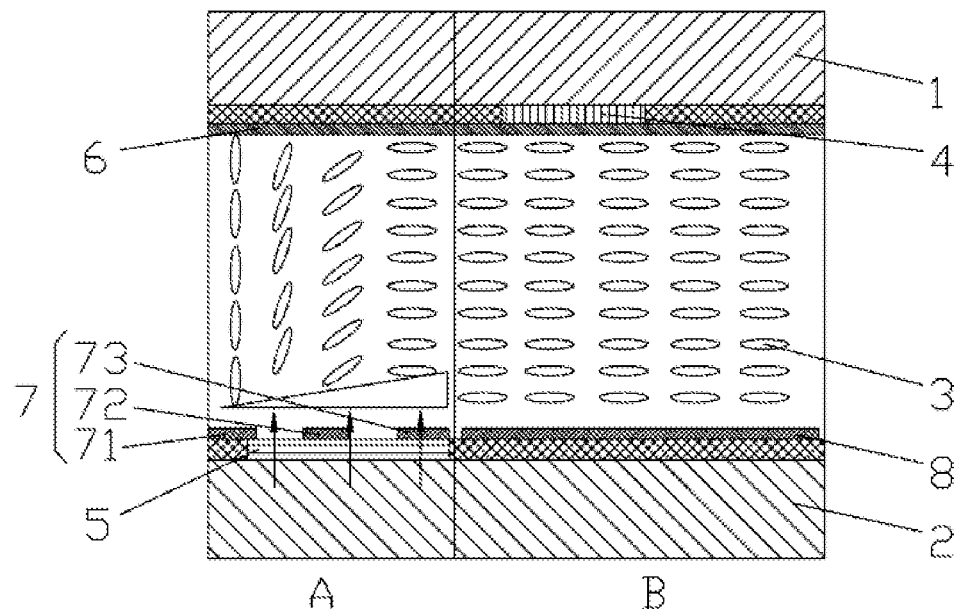
FIG. 1 shows a cross-sectional view of one pixel region in a liquid crystal display panel according to an embodiment of the present disclosure.

An embodiment of the present disclosure provides a liquid crystal display panel including a color filter substrate 1 and an array substrate 2 which are assembled to form a cell, and liquid crystals 3 located therebetween. The liquid crystal display panel includes a plurality of pixel regions. As shown in FIG. 1, each pixel region includes a portion of the color filter substrate 1, a portion of the array substrate 2, and liquid crystals 3 located therebetween, and an orthographic projection of the portion of the color filter substrate 1 in the pixel region on the array substrate 2 overlaps the portion of the array substrate 2 in the pixel region.

As shown in FIG. 1, an area of each pixel region where the liquid crystals of the pixel region are located includes a first area A and a second area B that are arranged along a direction parallel to an plane in which the color filter substrate 1 extends and an plane in which the array substrate 2 extends. The portion of the color filter substrate 1 in each pixel region includes a black matrix 4, and the black matrix 4 is disposed on a side of the color filter substrate 1 adjacent to the liquid crystals 3 and is covered by an orthographic projection of the second area B of the pixel region on the color filter substrate 1. A light extracting member 5 is disposed on a side of the portion of the array substrate 2 in each pixel region adjacent to the liquid crystals 3, and is covered by an orthographic projection of the first area A of the pixel region on the array substrate 2. The light extracting member 5 is configured to emit vertical light having a traveling direction vertical to the plane in which the color filter substrate 1 extends and the plane in which the array substrate 2 extends.

In some embodiments, an orthographic projection of the portion of the color filter substrate 1 in the pixel region on the array substrate 2 completely overlaps the portion of the array substrate 2 in the pixel region.

Each of the pixel regions further includes a liquid crystal deflection control device configured to control respectively the liquid crystals in the first area A and the second area B of the pixel region to be deflected at different angles so as to realize display at different gray scales for a vertical viewing angle or for an oblique viewing angle.

By dividing each pixel region into two areas (i.e., the first area A and the second area B), and by controlling the liquid crystals 3 in the two areas to be deflected at different angles respectively by using the liquid crystal deflection control device, the vertical light emitted from the light extracting member 5 of the first area A may be refracted, and traveling direction of the refracted light may be adjusted, therefore switching between the display for the vertical viewing angle and the display for the oblique viewing angle can be realized, and anti-peep effects at different viewing angles can be ensured.

Moreover, by changing deflection angle of the liquid crystals 3, the traveling direction of the refracted light can be finely adjusted such that the refracted light is absorbed to different extents by the black matrix 4 in the second area B, thereby realizing the display at different gray scales for the vertical viewing angle or for the oblique viewing angle, and result in substantially a same display effect, such as in brightness or chromaticity, for both the vertical viewing angle and the oblique viewing angle.

In an embodiment of the present disclosure, as shown in FIG. 1, the liquid crystal deflection control device includes a common electrode 6, a first electrode 7, and a second electrode 8. The common electrode 6 is disposed on a side of the black matrix 4 adjacent to the liquid crystals 3, and covers the first area A and the second area B. The first electrode 7 is disposed on a side of the light extracting member 5 adjacent to the liquid crystals 3, and includes a plurality of sub-electrodes arranged spaced apart from each other, so as to control a deflection angle of the liquid crystals in the first area A. An orthographic projection of the first electrode 7 on the array substrate 2 overlaps the orthographic projection of the first area A on the array substrate 2. In an embodiment of the present disclosure, the first electrode 7 includes a first sub-electrode 71, a second sub-electrode 72, and a third sub-electrode 73. However, the present disclosure is not limited thereto, and the first electrode 7 may include any number of sub-electrodes. The second electrode 8 is disposed on a side of the array substrate 2 adjacent to the liquid crystals 3, and an orthographic projection of the second electrode 8 on the array substrate 2 overlaps an orthographic projection of the second area B on the array substrate 2, so as to control a deflection angle of the liquid crystals in the second area B.

In an embodiment of the present disclosure, deflection angles of the liquid crystals in the first area A and the second area B are changed by changing voltages applied to the first electrode 7 and the second electrode 8.

Since the plurality of sub-electrodes of the first electrode 7 are disposed spaced apart from each other in a direction parallel to the plane in which the color filter substrate 1 extends and the plane in which the array substrate 2 extends, a voltage applied to each of the sub-electrodes of the first electrode 7 can be independently controlled. As a result, a deflection angle of liquid crystals 3 corresponding to each of the sub-electrodes can be independently controlled, and the liquid crystals 3 in the first area A can form a liquid crystal prism to refract the vertical light, such that the refracted light is deflected toward and incident on the second area B. Moreover, since the orthographic projection of the second area B on the color filter substrate 1 covers the black matrix 4, the display at different gray scales for the vertical viewing angle or for the oblique viewing angle can be realized by changing proportion of the refracted light absorbed by the black matrix 4, thereby achieving substantially the same display effect, such as in brightness or chromaticity, for the vertical viewing angle and the oblique viewing angle.

In some embodiments, the common electrode 6 includes a first portion covering the first area A and a second portion covering the second area B. The first portion and the second portion of the common electrode 6 may be integrally formed or may be two sub-electrodes independent of each other.

In some embodiments, the second electrode 8 may be in a shape of a strip.

According to an embodiment of the present disclosure, there is also provided a liquid crystal deflection control method for controlling deflection of the liquid crystals in the liquid crystal display panel described above. The liquid crystal deflection control method may include: controlling the liquid crystals 3 in the first area A and the second area B to be deflected at different angles respectively by using the liquid crystal deflection control device, so as to selectively perform one of display at different gray scales for the vertical viewing angle and display at different gray scales for the oblique viewing angle.

In an embodiment of the present disclosure, as described above, the liquid crystal deflection control device includes the common electrode 6, the first electrode 7, and the second electrode 8. The common electrode 6 is disposed on the side of the black matrix 4 adjacent to the liquid crystals 3, and covers the first area A and the second area B. The first electrode 7 is disposed on the side of the light extracting member 5 adjacent to the liquid crystals 3, and includes the plurality of sub-electrodes arranged spaced apart from each other, so as to control the deflection angle of the liquid crystals in the first area A. The orthographic projection of the first electrode 7 on the array substrate 2 overlaps the orthographic projection of the first area A on the array substrate 2. In an embodiment of the present disclosure, the first electrode 7 includes the first sub-electrode 71, the second sub-electrode 72, and the third sub-electrode 73. However, the present disclosure is not limited thereto, and the first electrode 7 may include any number of sub-electrodes. The second electrode 8 is disposed on the side of the array substrate 2 adjacent to the liquid crystals 3, and the orthographic projection of the second electrode 8 on the array substrate 2 overlaps the orthographic projection of the second area B on the array substrate 2, so as to control the deflection angle of the liquid crystals in the first area B.

Figure 2A:
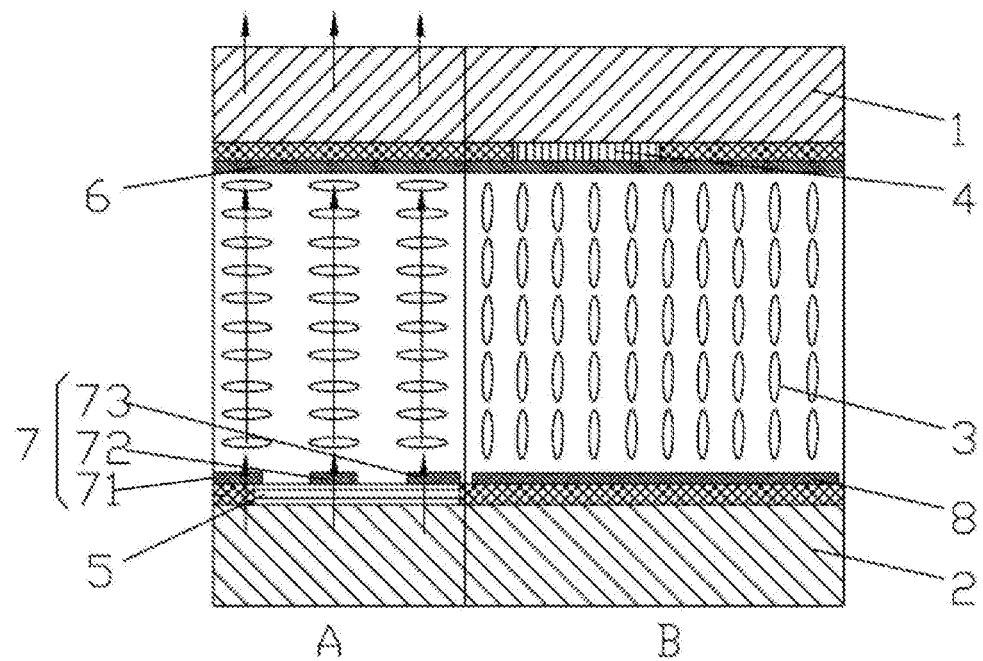
FIG. 2A shows a cross-sectional view of a liquid crystal display panel performing display at a gray scale of 255 for a vertical viewing angle according to an embodiment of the present disclosure.

In the embodiment of the present disclosure, as shown in FIG. 2A, the liquid crystals 3 in an initial state are in a horizontal orientation, i.e., in a direction parallel to the plane in which the color filter substrate 1 extends and the plane in which the array substrate 2 extends.

In some embodiments, as shown in FIG. 2A, the controlling the liquid crystals 3 in the first area A and the second area B to be deflected at different angles respectively by using the liquid crystal deflection control device, so as to perform the display at different gray scales for the vertical viewing angle may include: applying a preset first voltage to the second electrode 8, and applying a voltage of 0V to each sub-electrode of the first electrode 7.

In this case, the liquid crystals 3 in the first area A remains in the initial state without deflection, such that the vertical light emitted from the light extracting member 5 passes through the first area A and is directly incident on the color filter substrate 1, thereby switching the liquid crystal display panel to the display for the vertical viewing angle. At this time, a gray scale for the vertical viewing angle is 255, i.e., the liquid crystal display panel has a maximum brightness for the vertical viewing angle. In addition, when the voltage applied to the second electrode 8 is the first voltage, the liquid crystals 3 in the second area B are in a vertical orientation vertical to the horizontal orientation.

Figure 2B:
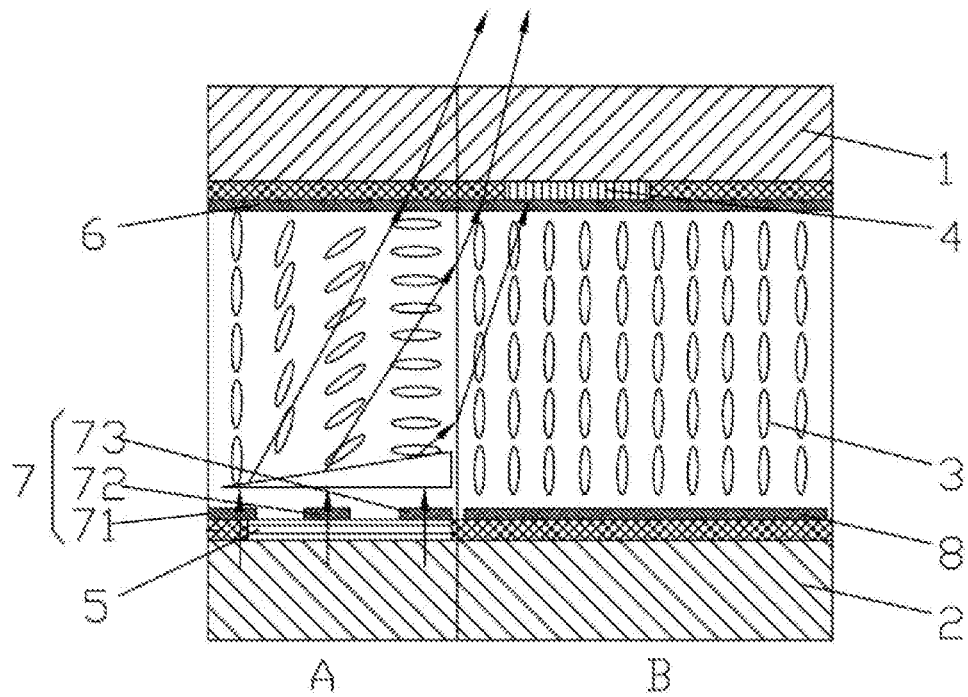
FIG. 2B shows a cross-sectional view of a liquid crystal display panel performing display at a gray scale of 127 for a vertical viewing angle according to an embodiment of the present disclosure.

In some embodiments, as shown in FIG. 2B, the preset first voltage is applied to the second electrode 8, different voltages are respectively applied to the first sub-electrode 71, the second sub-electrode 72 and the third sub-electrode 73, and the closer each of the first sub-electrode 71, the second sub-electrode 72 and the third sub-electrode 73 is to the second area B, the smaller the voltage applied to each of the first sub-electrode 71, the second sub-electrode 72 and the third sub-electrode 73 is. That is, the first electrode 7 includes the first sub-electrode 71, the second sub-electrode 72, and the third sub-electrode 73 arranged in a direction gradually approaching the second area B, the voltages applied respectively to the first sub-electrode 71, the second sub-electrode 72, and the third sub-electrode 73 have a stepped distribution, and the voltage applied to the first sub-electrode 71 is greater than the voltage applied to the second sub-electrode 72, and the voltage applied to the second sub-electrode 72 is greater than the voltage applied to the third sub-electrode 73.

In this case, the liquid crystals 3 in the first area A are deflected, and the deflection angle of the liquid crystals 3 gradually decreases as the liquid crystals 3 approaching the second area B such that the liquid crystals 3 in the first area A form a liquid crystal prism. At this time, the vertical light emitted from the light extracting member 5 is refracted by the liquid crystals 3 in the first area A, and is deflected toward the second area B. A portion of the refracted light is absorbed by the black matrix 4, and the remaining portion is obliquely emitted onto the color filter substrate 1. Proportion of the refracted light emitted onto the color filter substrate 1 may be changed by adjusting the voltages applied respectively to the first sub-electrode 71, the second sub-electrode 72, and the third sub-electrode 73, thereby realizing the display at different gray scales for the vertical viewing angle. The gray scale for the vertical viewing angle may vary from 1 to 254.

Figure 2C:
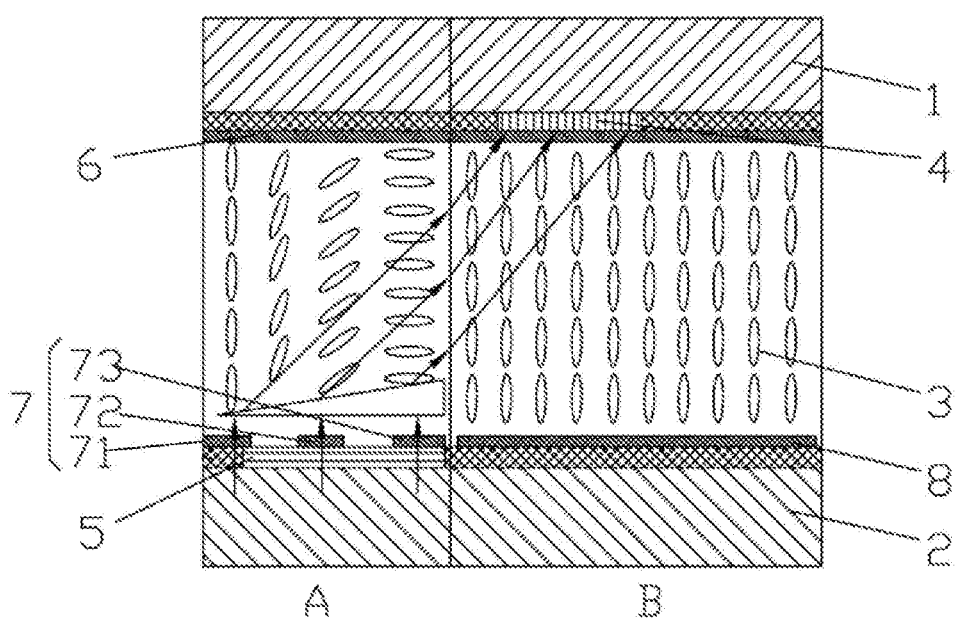
FIG. 2C shows a cross-sectional view of a liquid crystal display panel performing display at a gray scale of 0 for a vertical viewing angle according to an embodiment of the present disclosure.

In some embodiments, as shown in FIG. 2C, if the refracted light is completely absorbed by the black matrix 4, no light is emitted onto the color filter substrate 1, and the gray scale for the vertical viewing angle is 0.

In some embodiments, the first electrode 7 includes the first sub-electrode 71, the second sub-electrode 72, and the third sub-electrode 73 arranged in the direction gradually approaching the second area B, and when the first voltage is 8V and the voltages applied to the first sub-electrode 71, the second sub-electrode 72, and the third sub-electrode 73 are 8V, 4V, and 0V respectively, the gray scale for the vertical viewing angle is 0.

In some embodiments, the first electrode 7 includes the first sub-electrode 71, the second sub-electrode 72, and the third sub-electrode 73 arranged in the direction gradually approaching the second area B, and when the first voltage is 8V and the voltages applied to the first sub-electrode 71, the second sub-electrode 72, and the third sub-electrode 73 are 5V, 2V, and 0V respectively, the gray scale for the vertical viewing angle is 127.

Figure 3A:
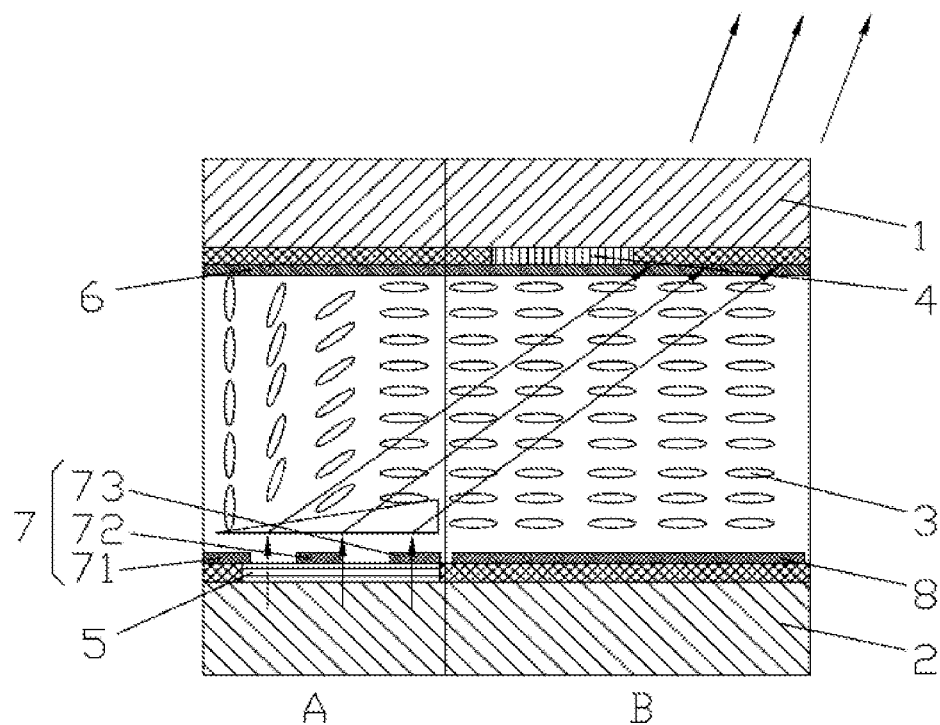
FIG. 3A shows a cross-sectional view of a liquid crystal display panel performing display at a gray scale of 255 for an oblique viewing angle according to an embodiment of the present disclosure.

In some embodiments, as shown in FIG. 3A, the controlling the liquid crystals 3 in the first area A and the second area B to be deflected at different angles respectively by using the liquid crystal deflection control device, so as to perform the display at different gray scales for the oblique viewing angle may include: applying a voltage of 0V to the second electrode 8, and applying different voltages to the first sub-electrode 71, the second sub-electrode 72 and the third sub-electrode 73 respectively, and the closer each of the first sub-electrode 71, the second sub-electrode 72 and the third sub-electrode 73 is to the second area B, the smaller the voltage applied to each of the first sub-electrode 71, the second sub-electrode 72 and the third sub-electrode 73 is. That is, the first electrode 7 includes the first sub-electrode 71, the second sub-electrode 72, and the third sub-electrode 73 arranged in a direction gradually approaching the second area B, the voltages applied to the first sub-electrode 71, the second sub-electrode 72, and the third sub-electrode 73 have a stepped distribution, and the voltage applied to the first sub-electrode 71 is greater than the voltage applied to the second sub-electrode 72, and the voltage applied to the second sub-electrode 72 is greater than the voltage applied to the third sub-electrode 73.

In this case, the liquid crystals 3 in the second area B remains in the initial state without deflection, and the liquid crystals 3 in the first area A are deflected to form a liquid crystal prism, such that the vertical light emitted from the light extracting member 5 is refracted by the liquid crystals 3 in the first area A, and is deflected toward the second area B. The refracted light is incident on and passes through the second area B, and then is emitted onto the color filter substrate 1, thereby switching the liquid crystal display panel to the display for the oblique viewing angle. At this time, a gray scale for the oblique viewing angle is 255, i.e., the liquid crystal display panel has a maximum brightness for the oblique viewing angle.

Figure 3B:
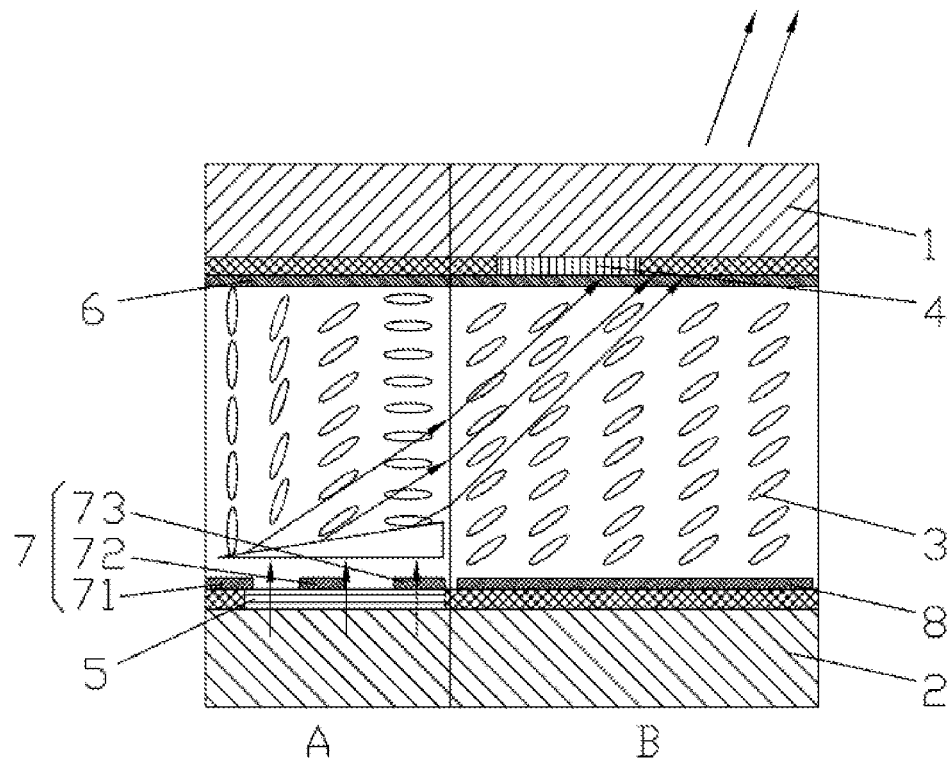
FIG. 3B shows a cross-sectional view of a liquid crystal display panel performing display at a gray scale of 127 for an oblique viewing angle according to an embodiment of the present disclosure.

In some embodiments, as shown in FIG. 3B, a preset second voltage is applied to the second electrode 8, different voltages are applied to the first sub-electrode 71, the second sub-electrode 72 and the third sub-electrode 73 respectively, and the closer each of the first sub-electrode 71, the second sub-electrode 72 and the third sub-electrode 73 is to the second area B, the smaller the voltage applied to each of the first sub-electrode 71, the second sub-electrode 72 and the third sub-electrode 73 is.

In this case, the liquid crystals 3 both in the first area A and the second area B are deflected such that the vertical light emitted from the light extracting member 5 are twice refracted. A portion of the refracted light is absorbed by the black matrix 4, and the remaining portion is obliquely emitted onto the color filter substrate 1. In a case that the voltages applied to the first sub-electrode 71, the second sub-electrode 72, and the third sub-electrode 73 remain unchanged, proportion of the refracted light emitted onto the color filter substrate 1 may be changed by adjusting the second voltage applied to the second electrode 8, thereby realizing the display at different gray scales for the oblique viewing angle. The gray scale for the oblique viewing angle may vary from 1 to 254.

Figure 3C:
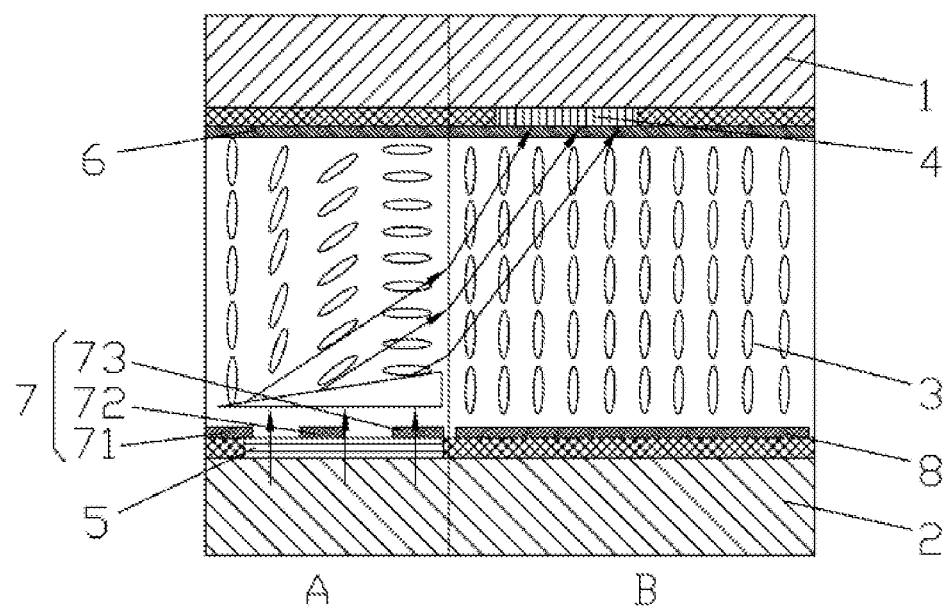
FIG. 3C shows a cross-sectional view of a liquid crystal display panel performing display at a gray scale of 0 for an oblique viewing angle according to an embodiment of the present disclosure.

In some embodiments, as shown in FIG. 3C, if the refracted light is completely absorbed by the black matrix 4, no light is emitted onto the color filter substrate 1, and the gray scale for the oblique viewing angle is 0.

In some embodiments, the first electrode 7 includes the first sub-electrode 71, the second sub-electrode 72, and the third sub-electrode 73 arranged in the direction gradually approaching the second area B, and when the voltages applied to the first sub-electrode 71, the second sub-electrode 72, and the third sub-electrode 73 are 8V, 4V, and 0V respectively, and the second voltage applied to the second electrode 8 is 0V, the gray scale for the oblique viewing angle is 255.

In some embodiments, the first electrode 7 includes the first sub-electrode 71, the second sub-electrode 72, and the third sub-electrode 73 arranged in the direction gradually approaching the second area B, and when the voltages applied to the first sub-electrode 71, the second sub-electrode 72, and the third sub-electrode 73 are 8V, 4V, and 0V respectively, and the second voltage applied to the second electrode 8 is 5V, the gray scale for the oblique viewing angle is 127.

In some embodiments, the first electrode 7 includes the first sub-electrode 71, the second sub-electrode 72, and the third sub-electrode 73 arranged in the direction gradually approaching the second area B, and when the voltages applied to the first sub-electrode 71, the second sub-electrode 72, and the third sub-electrode 73 are 8V, 4V, and 0V respectively, and the second voltage applied to the second electrode 8 is 8V, the gray scale for the oblique viewing angle is 0.

In some embodiments, a voltage applied to the common electrode 6 is 0V.

In conclusion, in the liquid crystal display panel and the liquid crystal deflection control method according to the embodiments of the present disclosure, by dividing each pixel region into two areas, and by controlling the liquid crystals in the two areas to be deflected at different angles respectively by using the liquid crystal deflection control device, the vertical light emitted from the light extracting member can be refracted, and the traveling direction of the refracted light can be adjusted, thereby realizing switching between the display for the vertical viewing angle and the display for the oblique viewing angle of the liquid crystal display panel, and ensuring anti-peep effects at different viewing angles.

Moreover, by changing the deflection angle of the liquid crystals, the traveling direction of the refracted light can be finely adjusted such that the refracted light is absorbed to different extents by the black matrix in the second area, thereby realizing the display at different gray scales for the vertical viewing angle or for the oblique viewing angle, and resulting in substantially the same display effect, such as in brightness or chromaticity, for the vertical viewing angle and the oblique viewing angle.

It should be understood that the above embodiments are merely exemplary embodiments for the purpose of illustrating the principle of the disclosure, and the disclosure is not limited thereto. Various modifications and improvements can be made by an ordinary skilled in the art without departing from the spirit and essence of the disclosure, and all the modifications and improvements also fall into the protection scope of the disclosure.

What is claimed is:

1. A liquid crystal display panel, comprising a color filter substrate and an array substrate which are assembled to form a cell, and liquid crystals located therebetween, wherein the liquid crystal display panel comprises a plurality of pixel regions, each of the plurality of pixel regions comprises a portion of the color filter substrate, a portion of the array substrate, and liquid crystals located therebetween, and an orthographic projection of the portion of the color filter substrate in each pixel region on the array substrate overlaps the portion of the array substrate in the pixel region;

an area of each pixel region where the liquid crystals of the pixel region are located comprises a first area and a second area, the first area and the second area are arranged along a direction parallel to an plane in which the color filter substrate extends and an plane in which the array substrate extends, the portion of the color filter substrate in each pixel region comprises a black matrix, the black matrix is disposed on a side of the color filter substrate adjacent to the liquid crystals and is covered by an orthographic projection of the second area of the pixel region on the color filter substrate, a light extracting member is disposed on a side of the portion of the array substrate in each pixel region adjacent to the liquid crystals and is covered by an orthographic projection of the first area of the pixel region on the array substrate, and the light extracting member is configured to emit vertical light having a traveling direction vertical to the plane in which the color filter substrate extends and the plane in which the array substrate extends; and each pixel region further comprises a liquid crystal deflection control device configured to control the liquid crystals in the first area and the second area of the pixel region to be deflected at different angles, respectively.

2. The liquid crystal display panel of claim 1, wherein the liquid crystal deflection control device comprises a common electrode, a first electrode, and a second electrode, the common electrode is disposed on a side of the black matrix adjacent to the liquid crystals, and covers the first area and the second area;

the first electrode is disposed on a side of the light extracting member adjacent to the liquid crystals, and comprises a plurality of sub-electrodes arranged spaced apart from each other, and an orthographic projection of the first electrode on the array substrate overlaps the orthographic projection of the first area on the array substrate;

the second electrode is disposed on a side of the array substrate adjacent to the liquid crystals, and an orthographic projection of the second electrode on the array substrate overlaps an orthographic projection of the second area on the array substrate; and deflection angles of the liquid crystals in the first area and the second area are changed by changing voltages applied to the first electrode and the second electrode.

3. The liquid crystal display panel of claim 2, wherein the common electrode comprises a first portion covering the first area and a second portion covering the second area, and the first portion and the second portion are integrally formed.

4. The liquid crystal display panel of claim 2, wherein the common electrode comprises a first portion covering the first area and a second portion covering the second area, and the first portion and the second portion are two sub-electrodes independent of each other.

5. The liquid crystal display panel of claim 2, wherein the second electrode is in a shape of strip.

* * * * *